United States Patent [19]

Brown, Jr.

[11] 3,876,299

[45] Apr. 8, 1975

[54] MICROFORM CARD INCLUDING SURFACE LOCATING STRUCTURE FOR ELIMINATION OF NEWTON RING COLOR BANDING AND CARD UTILIZATION APPARATUS THEREFOR

[75] Inventor: George T. Brown, Jr., Dayton, Ohio

[73] Assignee: NCR Corporation, Dayton, Ohio

[22] Filed: Sept. 24, 1973

[21] Appl. No.: 400,406

[52] U.S. Cl. .................. 353/120; 355/125; 350/241

[51] Int. Cl. .......................................... G03b 21/00

[58] Field of Search ........ 350/241, 255; 353/25, 27, 353/120; 354/292; 355/125, 133; 40/28 A, 28 C, 52 B, 53 A, 62, 64 A, 105.5

[56] References Cited

UNITED STATES PATENTS 3,519,348 7/1970 McLaughlin ........................ 355/125

*Primary Examiner*—Ronald L. Wibert
*Assistant Examiner*—Michael J. Tokar
*Attorney, Agent, or Firm*—J. T. Cavender; Albert L. Sessler, Jr.; Elmer Wargo

[57] ABSTRACT

Disclosed is an improved microform card which includes a wear-strip spacer element structure located on the card surface in one of several configurations, some containing coded secondary information. The wear-strip spacer elements separate the card surface from adjacent optical elements in a card utilizing apparatus by a distance sufficient to prevent the formation of colored Newton rings at the card-to-optical-element interface. Card utilization equipment capable of recognizing the presence of wear-strip spacer elements on a microform card and using any secondary information encoded thereon is also disclosed.

28 Claims, 11 Drawing Figures

MICROFORM CARD INCLUDING SURFACE LOCATING STRUCTURE FOR ELIMINATION OF NEWTON RING COLOR BANDING AND CARD UTILIZATION APPARATUS THEREFOR

BACKGROUND OF THE INVENTION

1. Field of the Invention

This invention relates to the field of microform cards of the microfiche, ultrafiche PCMI (TM) and similar types and to card viewers, printers, sorters and related optical equipment which receive microform cards for utilization.

2. Description of the Prior Art

In the field of optics and photography, the prior art includes the use of a film media supporting element such as a specially prepared glass surface, commonly having diffusing characteristics, located adjacent to a photographic image carrying member for the purpose of preventing Newton ring image formation. An example of this technology is found in the Emde "Anti-Newton Ring" glass sold by Emde Products Incorporated of 2040 Stoner Avenue in Los Angeles, Calif., for use with color slides and lantern slides in projecting equipment.

Although Emde glass technology does provide optical interfaces which are free of Newton ring color bands, in the general purpose photography field, it is found that incorporation of diffusing elements in a microform card system is attended by undesirable features such as reduced optical efficiency and blurring of the optical image.

SUMMARY OF THE INVENTION

Spacer elements or wear strip members in one of several configurations are added to the viewing face topology of a microform card in a pattern which avoids obstructing the optical images on the card and is capable of holding a viewing optical lens separated from the surface of the card by a small and relatively constant distance. The housing of the viewing optical lens is permitted to rest upon the spacer elements and the card during use of the card. Additional spacer elements or wear strip members may also be added to the illuminated face of the microform card for holding this face separated from portions of the illuminating apparatus. Holding the microform card surface and adjacent optical elements separated by some small distance during usage precludes the formation of colored light interference rings or Newton rings at points where the card surface and the optical elements would otherwise be variably separated by only a few microns of space.

Card utilizing apparatus for viewing or otherwise using the optical data on a microform card is included in the invention. This apparatus is embodied with a capability for employing the spacer elements or wear strip members added for Newton ring color band elimination for such auxiliary purposes as locating specified areas of the card or for encoding secondary data on the card.

DESCRIPTION OF PREFERRED EMBODIMENT

Figure 1:
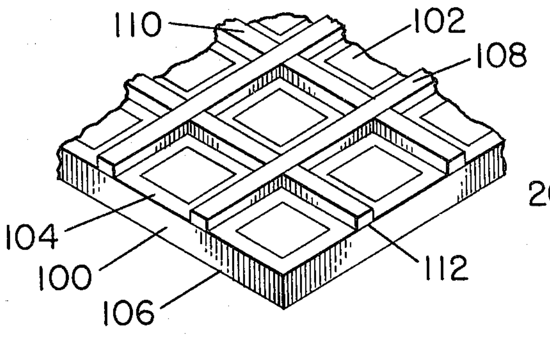
FIG. 1 shows an embodiment of the present spacer element invention wherein a grid network of generally rectangular spacer elements is attached to a surface of a microform card.

In optics it is well known that when multichromatic light is passed through such a nonuniform thin film diffracting medium, it is separated according the thickness of the interference layer zones into the components of its spectrum results in a rainbow-like display. Light passing through the walls of a soap bubble and producing visible color bands on the various bubble surface areas is one example of the spectrum generating capability of a nonuniform thin film diffracting medium.

In the field of microimage utilization, where a variety of optical equipment including viewers, microscopes, photographic printers and display devices are employed to provide access to photographic images that are reduced in size by factors of generally 10 to the first power or 10 to the second power, and where these reduced images are located on a variety of carriers including the semi-rigid plastic cards employed in the microfiche, ultrafiche and PCMI systems or in strip or spiral image sequence microfilm systems, varying light diffraction at the interface of an optical element and an air lamini of nonconstant thickness produces an especially annoying and troublesome form of color spectrum display. In the present specification, the various microimage systems including those named above are generally named microform cards, and the various optical access devices are generally named utilization devices; it is intended of course that both of these generic names not be limited to any of the specifically recited embodiments.

When a microform card is illuminated on one side by a lighted source and has information collected optically from the other side for utilization, it is found that both the juncture of the microform card with the illumination source and the juncture of the microform card with the optical collecting apparatus are locations which may include air lamini of varying thickness and which are therefore capable of interfering with the light rays present by trapping or passing various wave lengths of the light spectral components. As a result of this light separation into spectral components, optical images received from the microform card will be observed to include one or more families of multicolored light bands having a generally closed and irregular schmoo-like shape which is variable in response to pressure applied between the microform card and the adjacent optical elements. These colored bands are well known in the optics art and have been given the name of Newton rings or Newton ring color bands.

Since the air lamini structure which produces Newton ring color bands has a thickness measured in fractions of a light wave length, or millionths of an inch, several characteristics of these rings are defined.

1. The dimensions and shape of the Newton ring family are highly responsive to the degree of mechanical force tending to force together the optical members which include the air lamini. Small force changes will alter the size, coloration and shape of the rings by deforming the adjacent or space-defining optical members.
2. Several families of rings are to be observed in a structure having a point or small region of intimate contact surrounded by an area of increasing optical element separation, five orders of color bands being commonly found in microform card reading equipment as the air lamini thickness surrounding the point of contact increases through successive multiples of a wave-length fraction.
3. Even though color bands exist for element separations corresponding to larger than fifth order bands, the energy content of these higher order color bands is generally so low as to make them unnoticeable against the background of a normal photographic image contained on a microform card. 4. Where the point of contact between adjacent optical elements is small and the contact points are isolated and are separated by regions of relatively large element separation, it is found that any Newton ring color bands generated are so small as to be nonresolvable by an optical system and the human eye, with the result that a system free of Newton ring color bands is thereby produced. Common embodiments of this form of Newton ring color band suppression include the use of a frosted or etched surface between contacting optical elements and the use of the previously described Emde glass in contact with the photographic elements in an optical display system.
5. If two light transmitting optical members can be placed in contact without the intervention of an air lamini layer of varying thickness, that is, if each member of an optical pair conforms precisely to the shape of the other member so that no air or other intermediate material is present between them, there will be no generation of Newton ring color bands at the optical interface.

Each of the latter three of these characteristics, that is, the use of relatively large optical element separations, the use of a frosted or textured optical surface on one member of an interfacing pair, and the use of closely conformed shapes in optical members offers an approach for eliminating the generation of Newton ring color band images in a microform card system.

Although the last of the above characteristics, the use of closely conformed shapes in an optical pair, can be relied upon for the elimination of Newton ring color bands in a microform card system by immersing the card in a liquid or oil having a matching refractive index or by using a transparent member to fill all of the space between an adjacent pair of optical elements, it is difficult or even impossible to employ this technique between fixed and removable members in a practical optical system in which a single optical lens element or system is employed in utilizing many different microform cards and where the microform cards themselves do not have great dimensional stability.

As recited previously, a Newton ring color band elimination system employing a frosted or textured optical surface on one member of an interfacing optical pair is described in the prior art; this system employs an etched or frosted or textured surface glass member which has been named Emde glass by its manufacturer. This system, although satisfactory for some larger-image-area, optical-projecting equipment, is not feasible for use in microscale optical-projecting equipment in which an optical lens assembly is used commonly in contact with a microform card. Using the Emde glass approach requires that either the receiving optical lens surface be in contact with the microform card surface, or that its contacting opposite member, the microform card surface be frosted. Frosting tends to scatter some of the light rays, and the scattering must necessarily degrade the image quality, especially with microimages.

The remaining one of the above three characteristics, the use of relatively large optical element separations, underlies the structures which are to be described hereinafter. These structures include a variety of embodiments wherein a spacer element or a wear strip which has a thickness that is large with respect to the wave length of visible light or a thickness of a great many wave lengths of light is attached to one or to both surfaces of a microform card for the primary purpose of preventing formation of Newton ring color band images at the contacting interface between the microform card and its oppositely contacting optical surfaces of the related lens apparatus.

Since the additional spacer thickness required on the microform card image surface is at least several wave lengths of ordinary light frequencies, in order that Newton ring color band images not be formed, and since spacer elements of a thickness greater than this are more easily formed and attached to a microform card in practice, it is contemplated that a much larger thickness than the several wave lengths of visible light (even as much as a sheet of paper) may be economically and conveniently employed in practical embodiments of the invention, and that these practical embodiment spacer elements will also have secondary utility in protecting the microform card surface from abrasions or other abuse during use and storage as well as being a suitable substrate or carrier for the storage of information. Several other secondary capabilities of the microform card spacer elements will be defined in connection with the description of specific embodiments of the spacer elements which follow.

In the FIG. 1 drawing, spacer elements are attached to one surface of a microform card. In FIG. 1, it is intended that the card surface 106 be directed toward a source of illumination and that light be transmitted through the card body portion 100 in order that the photographic images 102 be viewable through an optical lens apparatus which is not shown but which is located on the side of the card adjacent surface 104. The images 102 are supported by the nonimage retaining areas or supporting areas of the body portion 100, and surfaces 104 and 106 are on opposite sides of body portion 100.

Spacer elements which prevent formation of Newton ring color bands by separating the lens assembly and the card surface 104 are shown at 108 and 110 in FIG. 1, with the spacer elements 108 traversing the card surface 104 in a lateral direction generally perpendicular to that of spacer elements 110. As shown in FIG. 1, the spacer elements 108 are continuous over the length of card surface 104 and the spacer elements 112 are interrupted at their intersection with the elements 108, in order that a single thickness of spacer element be maintained at the intersection of elements.

The spacer elements 108 and 110 in FIG. 1 are connected with the surface 104 of the card body portion 100 in an interface which is designated 112 in FIG. 1. Interface 112 may include an adhesive material or a melded region containing materials from both the card body portion 100 and the spacer elements 110, and be produced through the use of solvent materials, ultrasonic welding, or heat, or may include other attachment structures which are known in the art. The term "bonded" is used to describe this interface in the present patent application; it is intended that bonded be descriptive of an adhesive or any other form of coupling between the spacer elements and the microform card surface. The term melded as used herein is intended to describe an interface which may be formed by a technique which resembles one or both of the processes of melting and welding.

The materials used in forming spacer elements 108 and 110 in FIG. 1 may include almost any plastic or metal or other dimensionally stable substance which can be attached to the card surface 104. In particular, it has been found that sheet stock made according to the foil manufacturing art, such as Dri Print Foils, made by Dri Print Foils Inc., of 80 Wheeler Point Road, Newark, N.J., and consisting of either plastic material or a laminated combination of plastic and metal materials provide a convenient and easily fabricated starting medium for manufacturing spacer elements of precise thickness in the FIG. 1 embodiment of the invention.

It is contemplated that during utilization of the microform card shown in FIG. 1, the optical lens apparatus which receives light through the photographic image areas 102 will actually rest upon at least two of the spacer elements running in each direction on the card surface 104. In this arrangement the spacer elements provide the separation between surface 104 and the first optical element of the lens assembly required to prevent formation of Newton ring color-bands and also provide the constant optical axis alignment as well as the precise separation between lens assembly and surface 104 required for eliminating refocusing of the lens apparatus. The spacer elements 108 and 110 also protect the surface 104 from indentation abrasions by contact from dust and the end of the lens assembly and from lateral or frictional scratching which commonly occurs during storage and handling of microform cards.

Even though the spacer elements 108 and 110 are shown located between every pair of optical images in both surface directions of the card shown in FIG. 1, it is found in practice that spacer element location at periodic intervals across the face of a card rather than between every pair of optical images is sufficient to accomplish the desired separation of optical elements and simultaneous protection of the card surface.

Figure 2:
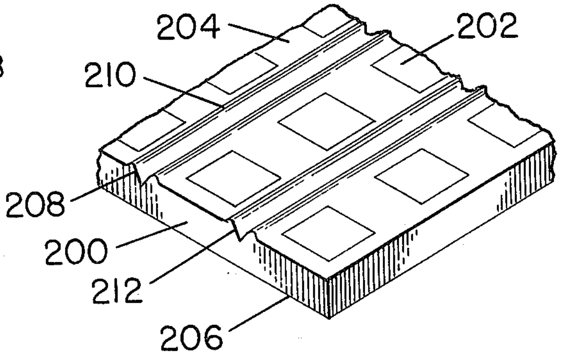
FIG. 2 shows an embodiment of the spacer element invention wherein an array of spacer element grooves is impressed in the surface of a microform card.

FIG. 2 of the drawings shows an alternate embodiment of the spacer elements of the present invention. In FIG. 2 a microform card is shown having an illuminated surface 206 and a viewing surface 204 and a body portion 200. In FIG. 2, as was true in FIG. 1, and is true in all of the drawings of this specification, the body portion 200 includes both a photographic film substrate material and a photographic image-carrying emulsion layer with the photographic images contained in the emulsion layer being represented as shown at 202 in FIG. 2. In FIG. 2 the spacer element function is provided by a network of regions wherein material has been displaced from parts of the card body portion 200 to form the grooves 208 and 212. The excessive or displaced material resulting from the formation of the grooves 208 and 212 is shown in FIG. 2 to have been relocated on the surface 204 in continuous ridges which are identified with the number 210.

In the FIG. 2 embodiment of the invention, the spacer element function which provides separation between surface 204 and the viewing optical lens apparatus which is not shown is provided by the material located in the continuous ridges 210.

The grooves 200 and 210 in FIG. 2 along with any of the displaced material forms of the spacer elements shown in the drawings may be formed in the microform body material through the application of some combination of mechanical force and heat energy to the card body material and may involve such techniques as scribing, embossing or debossing, or simply the application of a heated member along the surface. Alternately, displacements of this type may also be formed by subjecting the card surface to the heat of an ultrasonic die or of a laser beam. As the FIG. 2 drawing indicates, it is contemplated that the material in the continuous ridges 210 is displaced both vertically and laterally from the grooves 208 and 212 so that the material remains integrally attached to the body portion 200 rather than simply lying on top of the surface 204.

The grooves 208 and 212 in FIG. 2 are shown oriented along a single axis of the microform card rather than in the mutually perpendicular coordinate arrangement described in FIG. 1. In many applications of the invention it is found that orientation of the spacer elements in a single direction across the face of a card provides sufficient support for the viewing optical lens assembly. It is of course possible to employ the groove and continous ridge spacer elements of FIG. 2 in a multi-direction perpendicular arrangement as shown for the spacers of FIG. 1 if care is exercised in locating the material displaced from the grooves at the intersection of vertical and horizontally oriented (row and column) grooves.

The grooves 208 and 212 in FIG. 2 can be employed to convey information supplementing that contained in the photographic images 202. Information may be impressed upon the grooves 208 and 212 by providing minute dimensional variations in either the vertical or horizontal direction of the grooves or in both directions of the grooves in the manner which is known in the art of phonograph record manufacturing or dictaphone tape recording; this information may be coded according to a binary code or according to an analog format and can be retrieved as useful signals or data from the microform card during positioning movement of the card or by artificially moving a stylus member which engages the grooves at some selected velocity and at some selected time and location on the card.

Figure 3:
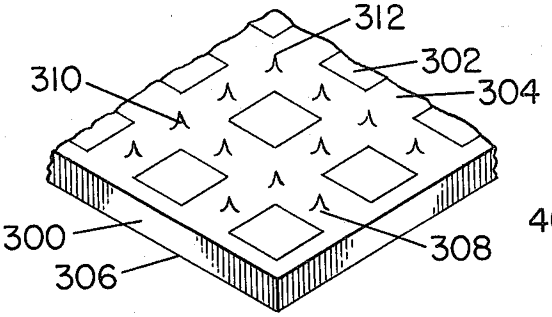
FIG. 3 shows an embodiment of the spacer element invention wherein a matrix of spacer element raised parts is attached to the surface of a microform card.

FIG. 3 shows another alternate embodiment of the spacer elements of the present invention. In FIG. 3 a microform card is shown having an illuminated surface 306 and a viewing surface 304 and a body portion 300. In FIG. 3 the spacer element function is provided by a network of raised points located on the viewing surface 304 and identified with the numbers 308, 310 and 312. In FIG. 3, the raised points which provide the spacer element function are shown to have a shape resembling a three dimensional mathematical cusp. These spacer elements may be formed by mechanically pulling a tacky substance upward from the surface 304 while the material is placed in the semi-solid state by the use of heat or solvents. These spacer elements can also be formed by using appropriately shaped dies or by other manufacturing techniques which are known in the art. They may be post-flat die pressed to a constant setdimension of height.

The spacer elements 308, 310 and 312 in FIG. 3 are shown located both between rows and columns of the photographic images 302 in the manner which was described for the spacer elements 108 and 110 of FIG. 1. As was true in the FIG. 2 embodiment of the invention, it is possible that spacer elements will not be required between every row and every column of photographic images as shown in FIG. 3 so that some periodic arrangement of the FIG. 3 elements is possible.

The population density of the spacer elements 308, 310 and 312 in FIG. 3 is graduated according to the location of these elements on the face of the microform card. In the FIG. 3 embodiment of the invention, the population density of the elements is greater at the edges of the card than in the center regions. Graduated population density of spacer elements is found to afford a variety of benefits to a microform card including an improved capability of being held in a flat condition against an illuminating member at the surface 306 in FIG. 3. This improvement results when the optical lens assembly, which is not shown, engages the spacer elements during use of the microform card and applies a pattern of force to the card which is in accordance with the density of the spacer elements. In the FIG. 3 embodiment of a microform card the population density of the spacer elements is shown to be greatest for the spacer elements 310 located near the edges of the microform card, this arrangement having been found desirable in preventing excessive clamping or working pressures on the edges of the card during use. In microform card applications where the card tends to buckle as a result of heating of the photographic image by the illuminating source of light, it is possible to decrease the population density of the spacer elements in the region between photographic images and surrounding the spacer element 312 in the more central regions of the card in order that forces from the viewing lens apparatus be equalized over the whole area including the central region so as to maintain the flatness of the card and to resist buckling.

As was true in the FIG. 1 and FIG. 2 embodiments of the invention, the raised point spacer elements of FIG. 3 provide the necessary separation between surface 304 and the input aperture element of the optical lens assembly as is required for preventing the formation of Newton ring color band images. The raised point spacer elements also provide mechanical protection for the surface 304 during use and storage of the microform cards.

Figure 4:
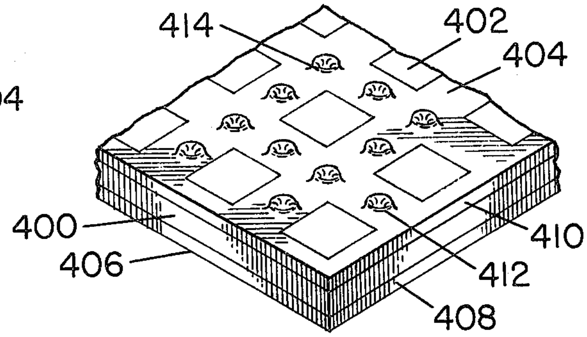
FIG. 4 shows an embodiment of the spacer element invention wherein a matrix of depression or dimple spacer elements is formed in the surface of a microform card.

FIG. 4 shows another alternate embodiment of the spacer elements of the present invention. In FIG. 4 a microform card is shown having an illuminated surface 406 and a viewing surface 404 and a body portion 400. In FIG. 4, the photographic substrate and emulsion layer portion of the microform card are shown to be sandwiched between two protective sheets of transparent material 408 and 410 in accordance with the technique which is known in the microform card art for protecting the photographic image surface of a card from wear during handling and use and for providing a microform card having greater rigidity or resistance to deformation.

In the FIG. 4 embodiment of the invention, the spacer element function is provided by a series of depressed or dimpled marks located in at least one of the protective sheet members 408 and 410. The depressed or dimpled marks 412 and 414 in FIG. 4 provide the spacer element function in a manner similar to that described for the displaced material of the grooves in the FIG. 2 embodiment of the invention. The dimpled or depressed marks 412 and 414 of FIG. 4 can also be produced by the application of mechanical energy or heat energy to the card as was described for the FIG. 2 embodiment of the invention.

Although any of the spacer element embodiments described in FIGS. 1 through 4 and in subsequent figures of the drawings of this specification can be used in combination with the sandwich protective sheet structure of FIG. 4, the dimpled or depressed mark form of the spacer elements illustrated in FIG. 4 is particularly desirable for use with the protective sheet structure since it allows simultaneous deformation of the top and bottom surface of the protective sheet member 410 in a manner which is doubly useful in preventing Newton ring color bands. In some embodiments of a sandwich protective sheet microform card, it is possible to exclude the layer of air lamini between the protective sheet 410 and the body portion 400 so that the formation of Newton ring color bands does not occur between the protective sheet and the body portion 400. Where this exclusion of an air lamini layer is not possible, it is desirable that the protective sheet 410 be held separate from the upper surface of the body portion 400 by a distance sufficient to prevent Newton ring color band formation. Since the dimpled and depressed marks 412 and 414 in FIG. 4 can extend through the thickness of the protective sheet 410 and protrude on the lower side of this protective sheet by a selected distance, the technique of employing dimpled and depressed marks to form the spacer elements provides the secondary advantage of allowing a controlled separation distance to be determined on both sides of the protective sheet member 410. The location and population density of the dimpled and depressed marks 414 and 412 in FIG. 4 can be arranged according to the requirements for eliminating Newton ring color band formation on both sides of the protective sheet 410. This is also true of the protective sheet 408.

Figures 5, 6, 8:
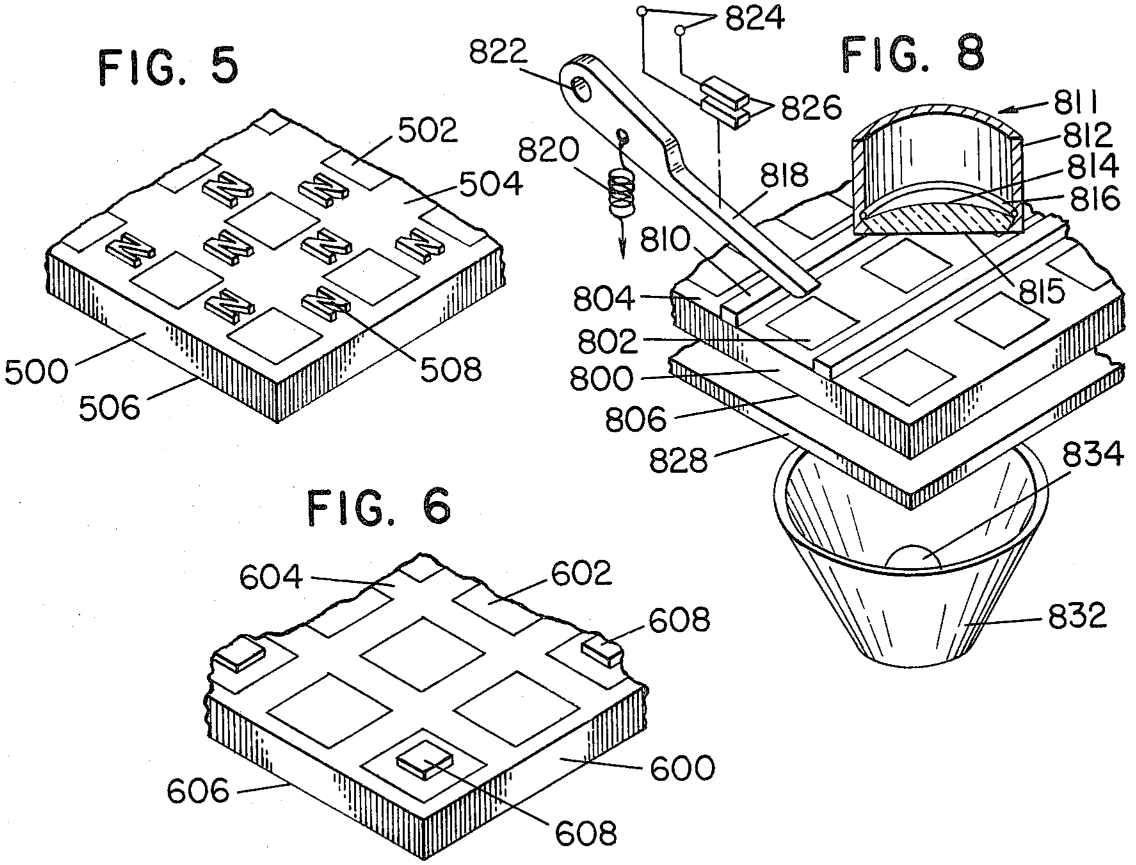
FIG. 5 shows an embodiment of the present invention wherein a plurality of symbol members having visually interpretable meaning are employed as spacer elements.
FIG. 6 shows an embodiment of the present invention wherein a plurality of raised members located in the photographic image field of a microform card are employed as spacer elements.
FIG. 8 shows a microform card made in accordance with the present invention along with the essential components of a card utilizing apparatus having a mechanical sensor of spacer elements.

FIG. 5 shows another alternate embodiment of the spacer elements of the present invention. In FIG. 5, a microform card is shown having an illuminated surface 506 and a viewing surface 504 and a body portion 500. In the FIG. 5 embodiment of the invention the spacer element function is provided by a series of human readable marks such as the letter N which is shown located in a series of rows and columns between photographic images 502 as indicated by the number 508.

The series of marks which form the spacer elements in FIG. 5 may be transparent or opaque or of any desired color or combination of colors and can be fabricated from inks, paints, toners, or similar colored materials which are applied in a semi-liquid or formable state to a desired thickness and allowed to solidify on the surface after application. These marks may also be formed by transferring pre-formed materials such as the foils which were described in connection with FIG. 1 of the drawings or may consist of overlay patterns or decals or similar transfers attached to the surface 504. The use of decal and foil materials offers the advantage of greater thickness uniformity for the spacer element than is ordinarily obtainable from wet or electrostatic or magnetic process, fluid-like inks, paints, toners and other pigmented or colored materials.

The marks providing the spacer element function in FIG. 5 as shown at 508 may of course contain various forms of secondary information such as printed text or machine readable codes or holograms.

FIG. 6 shows another alternate embodiment of the spacer elements of the present invention. In FIG. 6 a microform card is shown having an illuminated surface 606 and a viewing surface 604 and a body portion 600. In FIG. 6 the spacer element function is provided by a series of plateau regions identified with the number 608. In each of the previously described embodiments of the invention, the spacer elements have been located in unused portions of the microform card surface between photographic images and in the borders surrounding the photographic images in a manner which allows utilization of each potential photographic image area for information display purposes. In some microform card systems, the distance between adjacent photographic images is so small as to make location of spacer elements in this unused region of the card a tedious and difficult operation. Where small space or other reasons prevent use of the separation and border areas of the microform card for the spacer elements of the present invention it is possible to locate these elements in a card area which is normally occupied by some of the photographic images. Depending upon the rigidity of the microform card and the diameter of the optical lens assembly which receives information from the surface 604 in FIG. 6, it is possible that only a small fraction of the available photographic image locations need be occupied by the plateau region spacer elements shown even though these plateau region spacer elements are shown to occupy alternate rows of photographic image locations in the drawing. The plateau region elements of FIG. 6 may also be used to encode supplemental information on the microform card according to such features as their location, optical or electronic properties, shape and relative size. It is also conceivable that the plateau region embodiment of the spacer elements can be fabricated in a form which is sufficiently transparent to permit location of optical images beneath the plateau region structures in order that none of the potential photographic image area locations be sacrified for the incorporation of spacer elements. The concept of locating the spacer elements on a part of the card surface that is normally reserved for photographic images may of course be employed with any of the spacer element forms described in FIGS. 1 through 7.

Figure 7:
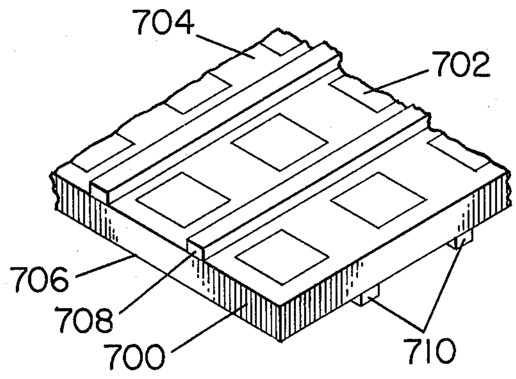
FIG. 7 shows an embodiment of the spacer element invention wherein a network of spacer elements is located on opposing sides of a microform card.

FIG. 7 shows another alternate embodiment of the spacer elements of the present invention. In FIG. 7 a microform card is shown having an illuminated surface 706 and a viewing surface 704 and a body portion 700. The spacer element function in FIG. 7 is provided by a series of elements 708 and 710 which are located on opposing sides of the card body portion 700 at right angles to each other or at least skewed with respect to each other. The spacer elements 708 and 710 may be of the type described in FIG. 1 or in any of the other figures of this specification and may be fabricated and attached to surfaces of the body portion 700 in accordance with the procedures described for the other figures of this specification. The spacer elements 708 and 710 may be of differing optical, electronic, or physical properties on the two faces 704 and 706, as they be desired.

The location of spacer elements on both sides of a microform card as shown in FIG. 7 is useful where Newton ring color bands are encountered at both surfaces of the card as may be the case where both surfaces contact glossy surfaced optical elements in the card utilization equipment and as may be the case where two or more photographic images are stacked through the card thickness at each possible photographic image location 702. In some microform card systems it is common practice to locate two photographic images in such a stacked configuration at one card location with one image being placed close to one surface of the card and the other image close to the second surface of the card. In the stacked image configuration, selection between the two or more images is performed by providing a viewing optical lens apparatus which has a very shallow depth of field and which can therefore focus upon one image at one depth location in the card to the virtual exclusion of a second or subsequent images at other depth locations of the same card. Two or more such cards can be stacked together without the formation of rings when this structure is used. Where the viewing optical lens apparatus must focus upon images located at different depths of the microform card structure, the formation of Newton ring color bands at each of the card surfaces, or of superimposed card surfaces becomes an important consideration. In microform card systems where the photographic images are located only near a single surface of the card, the formation of Newton ring color bands is important only at the image adjacent card surface since any color bands formed at opposing card surfaces will be rejected by being outside the depth of field of the viewing lens and hence appear severely out of focus as a background blur.

The FIG. 7 embodiment may of course be altered to include any of the previously described forms of the spacer elements with these elements being located at both surfaces of the card.

Although each of the spacer element embodiments described earlier in this specification provides increased mechanical stiffness and rigidity for the microform card to which they are added, the embodiment of FIG. 7 wherein the spacer elements are located on both surfaces of the card is especially effective in adding strength and rigidity to the card structure. In FIG. 7 the spacer elements on the opposing surfaces of the card are shown oriented in perpendicular directions, this perpendicular arrangement being especially effective for increasing card strength and rigidity.

FIG. 8 shows a microform card made according to the present invention along with some major elements of a utilizing system which is capable of collecting both optical and secondary spacer element information therefrom. The FIG. 8 microform card has an illuminated surface 806, a viewing surface 804 and a body portion 800 and has a grid of spacer element members 810 attached to the viewing surface 804. The illuminated surface 806 of the FIG. 8 microform card receives light from an illuminating apparatus which may include a clamping or support element 828, a reflecting element 832 and a lamp assembly 834. The viewing surface 804 of the microform card in FIG. 8 is observed by an optical lens assembly 811 which is shown positioned above and separated from the viewing surface but which is intended for use in the manner previously described wherein the surface 815 of the light receiving first element of the lens assembly rests upon the spacer element 810. The optical lens assembly 811 includes a barrel portion 812, and a light receiving element 814 which has a generally flat optical surface 815 on one side thereof and which may have a flat or a curved surface as shown at 814 on the opposing side. The light-receiving element of the optical lens assembly is retained in the barrel assembly 812 by retaining rings or similar devices shown at 816 in FIG. 8.

In addition to the optical apparatus of the FIG. 8 microform card utilizing system, there is also shown in FIG. 8 an electromechanical apparatus which is capable of receiving secondary information from the spacer elements of the card. The FIG. 8 electromechanical apparatus includes an arm member 818 which is pivoted at a point 822 and spring-loaded to rest upon the card surface 804 by a coil spring 820. The arm member 818 in FIG. 8 operates a pair of electrical contacts 826 which are connected to an external electrical circuit by way of the terminals 824.

Although several forms of information may be encoded mechanically into the spacer elements of a microform card, the embodiment shown in FIG. 8 employs the spacer elements to aid in automatic location of a desired photographic image. In operation of the FIG. 8 apparatus, the electrical contacts 826 close each time the arm member 818 encounters a spacer element on the surface of the microform card; in this manner, the card may be located in any desired position by merely disabling the movement mechanism after an appropriate number of spacer elements have been counted by the arm 818 during card movement. A conventional row and column indexing system (not shown) may be used to index the microform card in cooperation with the arm member 818.

Additional spacer elements perpendicular to those shown at 810 in FIG. 8 and additional electromechanical apparatus responsive to these additional spacer elements may, of course, be incorporated into the FIG. 8 apparatus in order that card location in both row and column or any coordinate system set of directions can be made possible by counting appropriate spacer elements. Once an electromechanical apparatus responsive to spacer element structure is added to a microform card system, it is possible to incorporate on the microform card additional spacer elementlike structures which are not needed for either Newton ring optical purposes or for location of the microform card beneath the optical lens assembly but which are useful for encoding additional information on the card.

Figure 9:
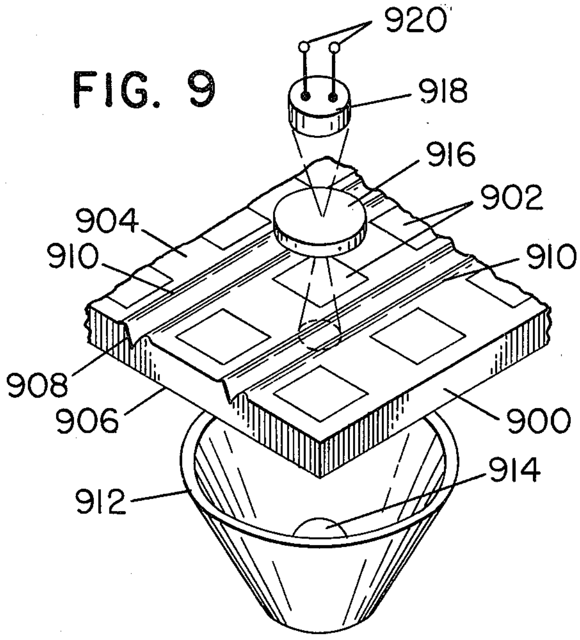
FIG. 9 shows a microform card made in accordance with the present invention along with the essential components of a card utilizing apparatus having an optical sensor for the spacer elements.

FIG. 9 shows a microform card made according to the present invention along with the active elements of a card utilizing system which is capable of collecting two forms of optical information from the card. In FIG. 9, the first form of card information is the customary array of photographic images as shown at 902, while the secondary form is associated with the grooves and continuous ridges 908 and 910.

In FIG. 9, the microform card is shown having an illuminated surface 906, a viewing surface 904, a body portion 900 and a spacer element which includes grooves and continuous ridges of the type described in FIG. 2. The microform card of FIG. 9 is illuminated by a source of light such as the incandescent lamp 914 which is mounted in a reflector assembly 912 and directed toward the illuminated surface 906. Light passing through the photographic images 902 is collected by the optical lens assembly 811 already described in relation to FIG. 8. A second light collecting assembly is also included in the FIG. 9 embodiment; this assembly receives light that is transmitted through the microform card and then scattered or focused, or deflected, or otherwise changed in intensity from the illumination level of the card background by the groove and continuous ridge structure 908 and 910 of the spacer element means. This secondary light collecting assembly includes the lens element 916 and an optical to electrical transducer element 918 which converts light signal received from the continuous ridge 910 and the groove 908 into an electrical signal appearing at the terminals 920.

The secondary light collecting assembly of FIG. 9 can be employed to position the microform card for reading a selected one of the photographic images 902 in a manner similar to that of the FIG. 8 system. In the FIG. 9 embodiment, the transducer element 918 is selected and adjusted to be discriminately responsive to the light emanating from the curved surface of the continuous ridges 910 in order that the passage of a spacer element between the light source 914 and the transducer element 918 is distinguishable from light transmission through the other areas of the microform card. An additional light collecting assembly involving a second transducer element similar to transducer element 918 may be incorporated into the FIG. 9 apparatus for sensing the passage of spacer elements which are oriented generally perpendicular to the direction of the groove 908 and for locating a particular photographic image in a designated row and column of the microform card.

In addition to the use of a secondary light collecting system for locating the microform card in a desired position as shown in FIG. 9, a secondary light collecting system may also be employed to retrieve coded data which is incorporated into a spacer element structure of the type shown in FIG. 9. This coded data can take on a variety of forms including small variations in the shape or depth of the continuous ridges 910 and the groove 908 or small changes in the light diffraction angle from these members, with these small variations being employed to alter light transmission around the groove and continuous ridge structure, or the data may involve a series of alternately opaque and translucent or colored and uncolored regions which are formed by adding some third modification or material to the surface of the otherwise unmodified groove and continuous ridge structures.

Figure 10:
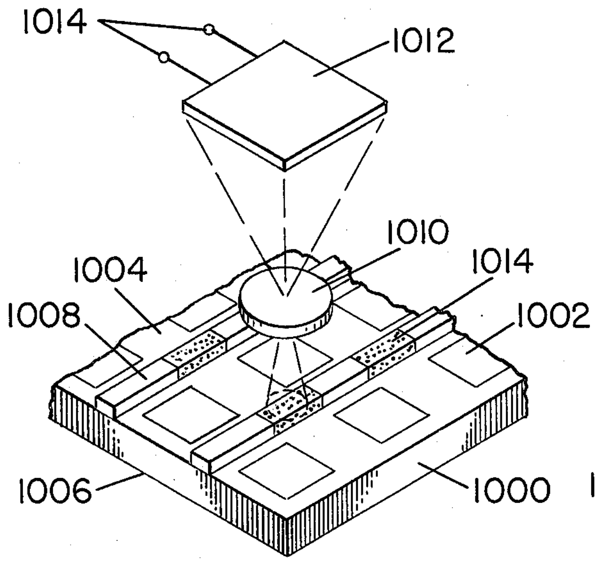
FIG. 10 shows a microform card made in accordance with the present invention along with the essential components of a card utilizing apparatus having an optical sensing system which is responsive to an alternate form of spacer elements.

In FIG. 10 there is shown a microform card and secondary light collecting apparatus which is similar to the FIG. 9 apparatus with the exception that a different configuration is employed for the spacer element. In FIG. 10 a microform card is shown having an illuminated surface 1006, a viewing surface 1004 and a body portion 1000 and including a network of photographic image areas 1002. The FIG. 10 apparatus also includes a transducer element 1012 which supplies electrical signals to a pair of terminals 1014 in response to light received from the spacer element 1008 via the lens assembly shown at 1010. As shown at 1014 in FIG. 10, the spacer element 1008 may include a series of light transmitting and opaque areas which are dimensionally coded to carry a secondary quantity of information. The transducer element 1012 in FIG. 10, in addition to responding to these dimensionally coded spacer elements, may also be made responsive to the changes in light transmitting ability which occur near the edges of the spacer elements 1008 in order that location of the spacer elements 1008 be identified by an electrical signal at the terminals 1014. It is also possible to select the upper surface of the spacer elements 1008 to have something other than a flat planar shape in order that light transmitted through these elements be focused or be scattered at the plane of the lens assembly 1010. The coded surface area 1014 could be an optical image hologram, highly resistant to abrasive damage, unlike normal images.

Figure 11:
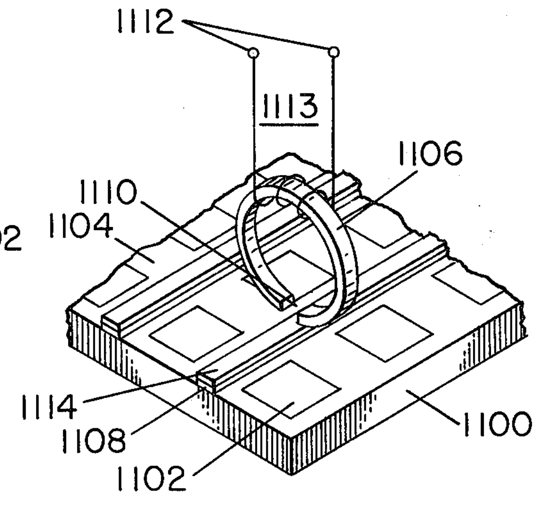
FIG. 11 shows a microform card made in accordance with the present invention along with the essential components of a card utilizing apparatus employing a magnetic sensor of spacer elements.

FIG. 11 shows yet another microform code made in accordance with the present invention along with the important elements of a microform card utilizing system which is capable of collecting secondary information from the card. In the FIG. 11 embodiment of the invention, the secondary information is contained on a magnetic recording media that is located on, or forms the spacer element structure that is employed to eliminate Newton ring color band formation. The microform card of FIG. 11 includes a body portion 1100, a plurality of photographic image areas 1102, a viewing surface 1104 and spacer elements 1108. The secondary information collecting apparatus in FIG. 11 includes a magnetic read head 1113 which includes a ferromagnetic core member 1106, an air gap 1110 and an electrical winding having a pair of terminals 1112. In the FIG. 11 apparatus the spacer element 1108 which is incorporated primarily for the purpose of preventing Newton ring color band image formation is provided with a layer of or contains magnetic recording material as indicated at 1114. This magnetic recording material may be composed of an iron oxide or nickel alloy or other material in accordance with technology which is known in the magnetic recording art.

In operation of the FIG. 11 apparatus, it is intended that the magnetic read head 1113 will be mounted in close proximity to the spacer element 1108 and will be responsive to magnetic information contained thereon. Scanning of the magnetic material in the spacer element 1108 may be provided by movement of the microform card or by movement of the recording head itself as is commonly practiced in the art of television magnetic tape recorders, or it may be of flux responsive type and capable of operation even while stationary as is known in the art.

From the preceding descriptions of microform cards having spacer elements incorporated thereon and the utilizing systems which collect information from these microform cards, it is apparent that the addition of spacer elements to one or both surfaces of a microform card not only provides a desirable method for eliminating the formation of Newton ring color band images when the microform card is displayed but also improves ability of the microform card by conveniently adding additional information storage capability and by acting as means for protecting the microform card from surface damage when in manual use or in storage files or in automated retrieval mechanisms. It eliminates the need for a cover or envelope. An important feature of the spacer element members of the present invention is that they can be applied to a microform card during its manufacture or be applied to old and existing microform cards in a post manufacturing step after the card has been used. When applied to an old card, the spacer elements not only provide Newton ring color band elimination but also tend to re-straighten the old card.

The spacer elements of the present invention also offer significant protection for the photographic images and the glossy surfaces of a microform card without adding extra or permanent overlaying protective material or coatings which if plastic, generally shows up or otherwise interferes with the dissipation of heat from the heat emitting images during illumination of a strong source of light.

The spacer elements of the present invention also provide complete protection of the microform card surface from lateral scratching or perpendicular embossing marks from particles which are smaller in diameter than the thickness of the spacer elements. Since the spacer elements of the present invention hold the viewing optical lens apparatus removed from the microform card surface by a distance larger than the diameter of these small particles, no abrasion of the image plane or card surface can result when the lens is moved across the card surface or when they are slipped into or out of a dirty file box or one's pocket.

The spacer elements of the present invention are also desirable in that they do not interfere with cleaning of the optical surfaces of a microform card, this being especially true of the embodiments shown in FIGS. 2 and 7 where spacer elements extend continuously across the face of the card in a single direction. Also, the higher ridges tend to electrostatically attract the dust first, being higher, hence, cleaner images result.

The spacer elements of the present invention have been found to improve the flatness of a microform card by relieving the internal lamination stresses existing in the card body and creating surface stresses in lieu of these internal laminating stresses; this being in accordance with the technique of "leveling" which is known in the mechanical forming arts and which substitutes surface stresses for volume stresses in a member.

It is also an advantage of the present spacer element invention that the spacer elements can be applied to a microform card either before or after the optical images are placed thereon. Since the normal silver halide types of photographic material employed in producing the image on a microform card is responsive to mechanical pressure as well as to light energy, the mechanical steps employed in producing or attaching the spacer elements on the microform card can also be used to create optically distinguishable patterns upon development of the photographic material of the microform card. These optically distinguishable marks may be coded according to a digital or an analog code as previously mentioned in this specification by applying a pattern of pressure points to the card during attachment or formation of the spacer elements.

Yet another advantage afforded by spacer elements of the present invention is that the separation between microform card surfaces and the first element of the optical lens assembly provided by these spacer elements allows the optical lens assembly to pass over the microform card without picking up tacky materials or finger oils which may be collected on the card surface. This freedom from material pick-up allows the optical lens assembly to be cleaned less frequently where microform cards including the spacer elements of the present invention are employed.

The forms of the spacer element and the methods of using the same herein described constitute particular embodiments of the invention, it is to be understood that the invention is not limited to these precise forms of spacer elements and using methods and that changes within the scope of the following claims may be made without departing from the scope and spirit of the invention.

What is claimed is:

1. An improved microform card comprising:

a card body portion incorporating a series of photographic image retaining areas intermixed with a series of non-image retaining areas;

spacer element means mounted on at least one surface of said card and having a thickness of at least several wavelengths of visible light for holding said card body portion removed from an adjacent optical element by at least said thickness;

whereby during illuminated use of said photographic image retaining areas, said microform card is held removed from said adjacent optical element by a space capable of preventing formation of Newton ring color band images at the interface of said card and said optical element.

2. The improved microform card of claim 1 wherein said spacer element means is comprised of displaced card surface material located between at least a portion of said photographic image retaining areas and overlaying a portion of said non-image retaining areas on said surface of said microform card.

3. The improved microform card of claim 1 wherein said spacer element means is comprised of additional material added to at least one surface of said microform card and overlaying a portion of said non-image retaining areas on said surface of said microform card.

4. The improved microform card of claim 1 wherein said spacer element is comprised of a plurality of indented tracks located in a surface of said body portion along with the nearby material displaced from said indented tracks during the formation thereof and wherein said tracks also contain minute dimensional variations capable of conveying information upon being scanned.

5. The improved microform card of claim 4 wherein said track dimensional variations are coded according to a binary code.

6. The improved microform card of claim 4 wherein said track dimensional variations include components which vary at an audio frequency rate.

7. The improved microform card of claim 1 wherein said series of photographic image retaining areas is arranged in a matrix of columns and rows and wherein said spacer element means is comprised of a series of dimpled depression marks located in spaces separating said image retaining areas and also comprised of the nearby card body material displaced from said dimpled depression marks.

8. The improved microform card of claim 7 wherein said series of dimpled depression marks includes at least one of said marks located generally along each one of four sides of an image retaining area.

9. The improved microform card of claim 8 wherein said series of dimpled depression marks includes a matrix of said marks located in spaces separating said image retaining areas.

10. The improved microform card of claim 1 wherein said spacer element means includes spacer elements located on both opposed surfaces of said microform card; whereby during illuminated use of said photographic image retaining areas, said microform card is held removed from adjacent optical elements located on both sides thereof.

11. The improved microform card of claim 1 wherein said spacer element means includes a plurality of first generally parallel spacer elements located on one side of said card and a plurality of second generally parallel spacer elements located on the other side of said card with said first and second generally parallel spacer elements being at least skewed in angular orientation with respect to each other.

12. The improved microform card of claim 11 wherein said first and second spacer elements are oriented at an angle of generally ninety degrees with respect to each other.

13. The improved microform card of claim 1 wherein said spacer element means includes a plurality of spacer elements graduated in population density according to location on the surface of said card; whereby force applied to said card by said adjacent optical element can be patterned to shape the topology of said card in a predetermined manner.

14. The improved microform card of claim 1 wherein said series of photographic image retaining areas is arranged in a matrix of columns and rows and wherein said spacer element means overlie at least a portion of the image positions in said matrix of columns and rows.

15. The improved microform card of claim 14 wherein said overlayed image positions are occupied exclusively by said spacer element means to the exclusion of photographic images therefrom.

16. The improved microform card of claim 1 wherein said spacer element means includes a layer of light transmitting material covering at least a portion of both said image retaining and non-image retaining areas.

17. The improved microform card of claim 1 wherein said spacer element means includes a layer of light absorbing material covering at least a portion of both said image retaining and non-image retaining areas.

18. The improved microform card of claim 1 wherein said spacer element means includes a layer of light reflecting material covering at least a portion of both said image retaining and non-image retaining areas.

19. The improved microform card of claim 1 wherein said card body portion includes photographic image retaining areas located in at least two different planes through the thickness of said card, and spacer element means mounted on at least one surface of said card.

20. The improved microform card of claim 1 wherein said spacer element means includes a plurality of human readable symbols each having a thickness of at least several wavelengths of visible light.

21. The improved microform card of claim 1 wherein said spacer element means is composed of a material different from said card body portion and is bonded to said surface of said card through an interface which includes a third material.

22. The improved microform card of claim 1 wherein said spacer element means is composed of material similar to said card body portion and is attached to a surface of said card body portion through a melded interface.

23. The improved microform card of claim 1 wherein said spacer element means includes a plurality of spacer elements composed of pigmented organic material.

24. The improved microform card of claim 1 wherein said spacer element means includes a plurality of spacer elements made from foil material and affixed to said one surface of said card; whereby the thickness uniformity of said foil material affords uniform separation and constant focus distance between said card body portion and said adjacent optical element across the face of said microform card.

25. The improved microform card of claim 24 wherein said foil material is nonmetallic.

26. The improved microform card of claim 25 wherein said foil material includes at least small particles of metallic material.

27. The improved microform card of claim 26 wherein said spacer element means has a smooth reflective optical surface.

28. An improved microform card for use with an optical viewing means having a source of light and a lens means for viewing the card, said card comprising:

a card body means, having first and second opposed surfaces for facing said source of light and lens means respectively;

said card body means having spaced image containing areas thereon and supporting areas between adjacent said image areas; and spacer means located on at least said second surface at said supporting areas and having a predetermined height at least equal to the combined length represented by several wavelengths of visible light;

said spacer means being effective to maintain the associated said lens means at said predetermined height away from said image areas when said card is optically viewed in said viewing means to thereby eliminate the formation of Newton ring color band images.

* * * * *